United States Patent [19]
Dawson

[11] 4,221,410
[45] Sep. 9, 1980

[54] VEHICLE PROTECTIVE GUARD

[76] Inventor: Jeffrey S. Dawson, 24 Golfview Drive, Newark, Del. 19702

[21] Appl. No.: 37,671

[22] Filed: May 10, 1979

Related U.S. Application Data

[63] Continuation-in-part of Ser. No. 868,487, Jan. 11, 1978, abandoned.

[51] Int. Cl.³ .............................................. B60R 19/02
[52] U.S. Cl. ......................................... 293/21; 293/128
[58] Field of Search ....................... 293/21, 22, 23, 27, 293/128

[56] References Cited

U.S. PATENT DOCUMENTS

| 1,021,796 | 4/1912 | Randerson | 293/128 |
| 1,500,730 | 7/1924 | Shimizu | 293/27 |
| 1,708,804 | 4/1929 | Schulman | 293/128 |
| 3,718,357 | 2/1973 | Hertzell | 293/21 |

*Primary Examiner*—John J. Love
*Assistant Examiner*—John A. Carroll
*Attorney, Agent, or Firm*—Abramo and Abramo

[57] ABSTRACT

A protective guard to protect the sides of a motor vehicle comprising a bumper, apparatus to move the bumper from a position adjacent the vehicle to a position away from the vehicle, and apparatus to raise and lower the bumper when in the latter position.

5 Claims, 11 Drawing Figures

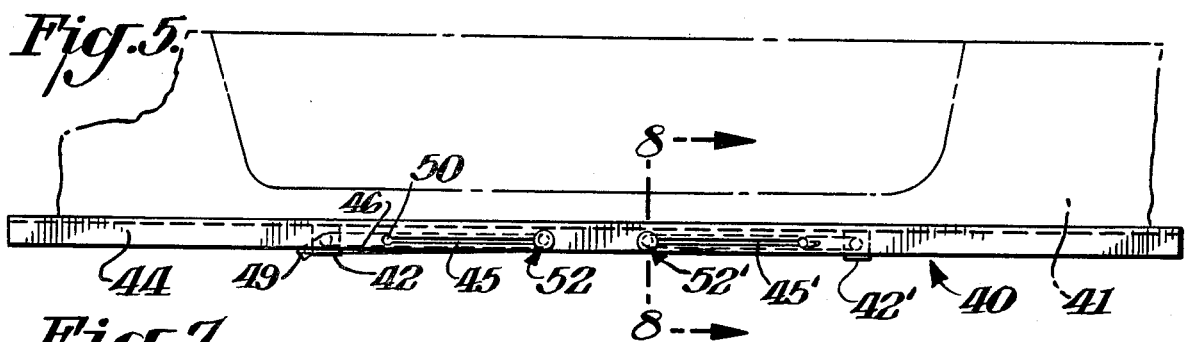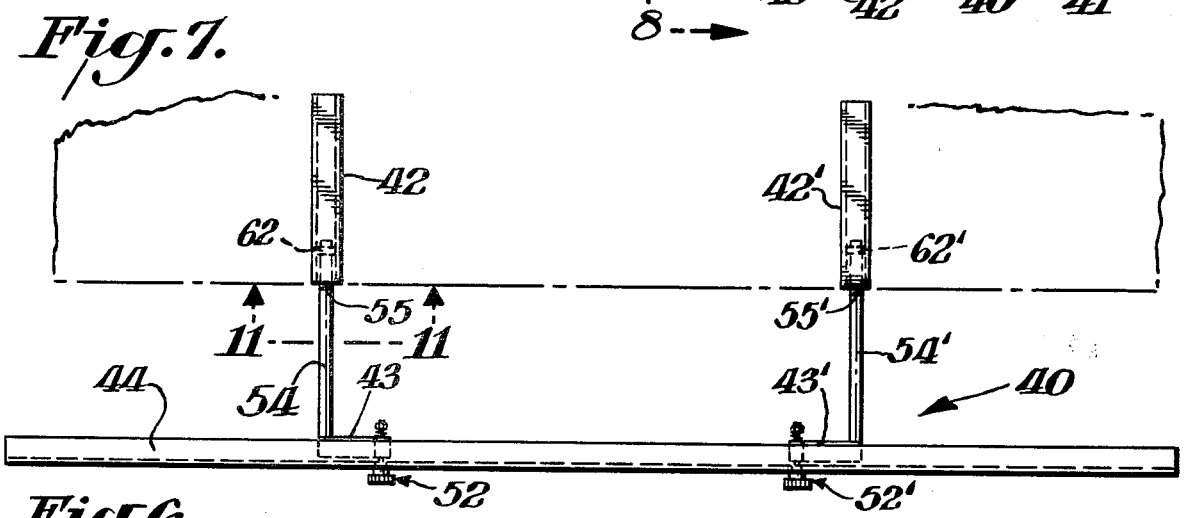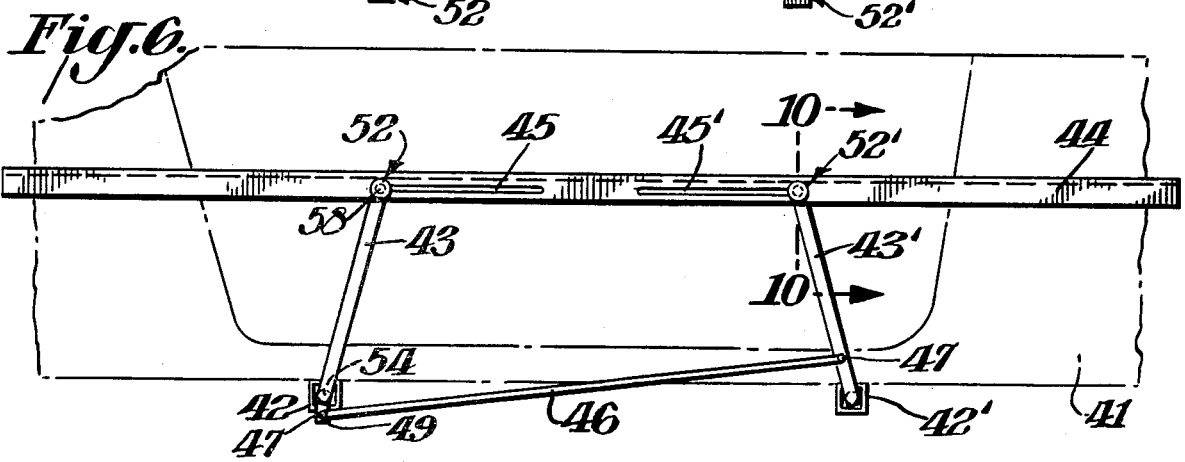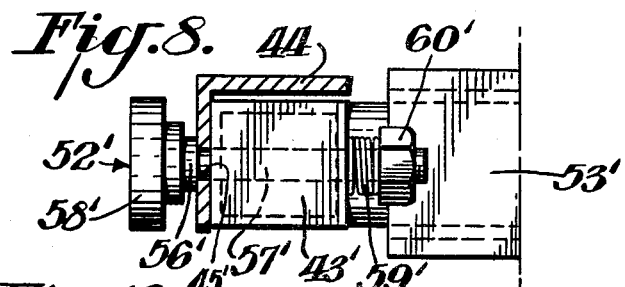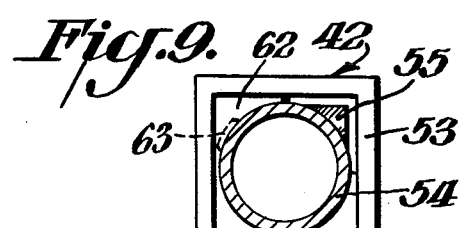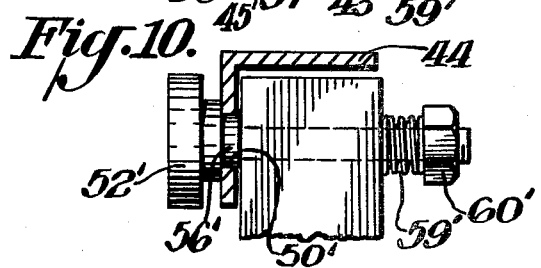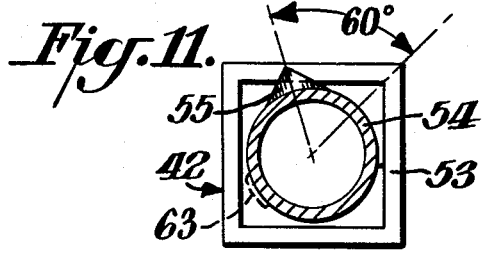

VEHICLE PROTECTIVE GUARD

CROSS-REFERENCE OTHER APPLICATIONS

This application is a continuation-in-part of my copending application Ser. No. 868,487, filed Jan. 11, 1978, and now abandoned.

FIELD OF THE INVENTION

This invention relates to protective devices for motor vehicles and more particularly to bumpers to protect the sides of the vehicle.

BACKGROUND OF THE INVENTION

Side bumpers for motor vehicles have been disclosed in U.S. Pat. Nos. 3,718,357 and 2,512,257. In U.S. Pat. No. 3,718,357, the bumper is extended horizontally from a position underneath the vehicle and a spring-operated hinge operates to rotate a flap on the bumper to a vertical, upright position. In U.S. Pat. No. 2,512,527, a side bumper guard is movable along a central point to and from a position under the vehicle and a position along the side of the vehicle.

Because of the use of a central point in U.S. Pat. No. 2,512,527 and because the flap of U.S. Pat. No. 3,718,357 is limited in size due to structural limitations, these patents provide devices which protect only a small area of the sides of the vehicle adjacent to the underside portion.

SUMMARY OF THE INVENTION

The invention described herein provides a protective guard apparatus which protects a substantial area of the sides. Specifically, this invention is a protective guard apparatus used in combination with a motor vehicle to protect the sides thereof which comprises, in combination, (a) bumper means positioned parallel to the sides of the vehicle;

(b) extension means affixed to the vehicle for moving said bumper means between a position adjacent said vehicle and another position spaced further away from said vehicle; and (c) pivot means operatively connected to said bumper means and said extension means for vertically raising and lowering said bumper means when spaced in said positions further away from said vehicle.

More specifically this invention is a protective guard apparatus to be used in combination with a motor vehicle which comprises, in combination, (a) bumper means positioned parallel to a side of said vehicle comprising an elongated bumper containing two slides slots elongated in the direction of elongation of the bumper;

(b) extension means affixed to the vehicle for moving said bumper means between a position adjacent said vehicle and another position spaced further away from the side of said vehicle;

(c) pivot means operatively connected to said bumper means and said extension means for upwardly raising and downwardly lowering said bumper means when spaced away from the side of said vehicle comprising two support arms, each having one end slidably affixed to a different said slide slot and the opposite end of each in permanently affixed relation with one another, said arms being engaged in said slide slots such that when ends of the arms are moved along the slides slots the bumper means moves upwardly from one position being the closed position, to a second position, being the raised position parallel to the first position and when the ends of the arms are moved in the opposite direction along the slide slots, the bumper means moves downwardly from the raised position to the closed position; and (d) locking means for maintaining the bumper means in raised position.

DESCRIPTION OF THE DRAWINGS

FIG. 5 is a side-elevational view of another embodiment of the bumper guard in down position.

FIG. 6 is a side-elevational view of the bumper guard of FIG. 5 in up position.

FIG. 7 is a top plan view of the bumper guard in up position as shown in FIG. 6.

FIG. 8 is a cross-sectional view of the locking mechanism when the assembly is in the down position taken along line 8—8 of FIG. 5.

FIG. 9 is a cross-sectional elevational view of the locking mechanism of FIG. 8 when the bumper is in the down position.

FIG. 10 is a cross-sectional view of the locking mechanism when the assembly is in the raised position along lines 10—10 of FIG. 6.

FIG. 11 is a cross-sectional elevational view of the locking mechanism of FIG. 10 when the bumper is in the raised position.

DESCRIPTION OF THE INVENTION

Figure 1:
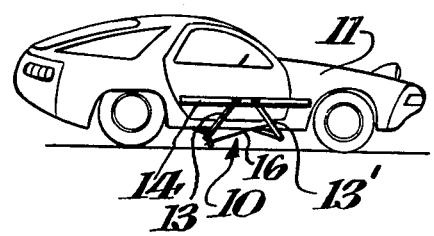
FIG. 1 is a pictoral view of an automobile with the protective guard of this invention attached thereto in its open position.
Figure 3:
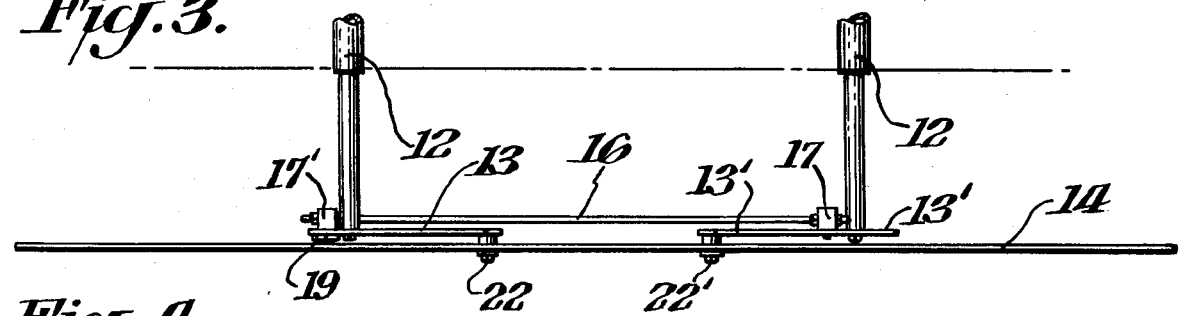
FIG. 3 is a top plan view of the guard in open position.
Figure 4:
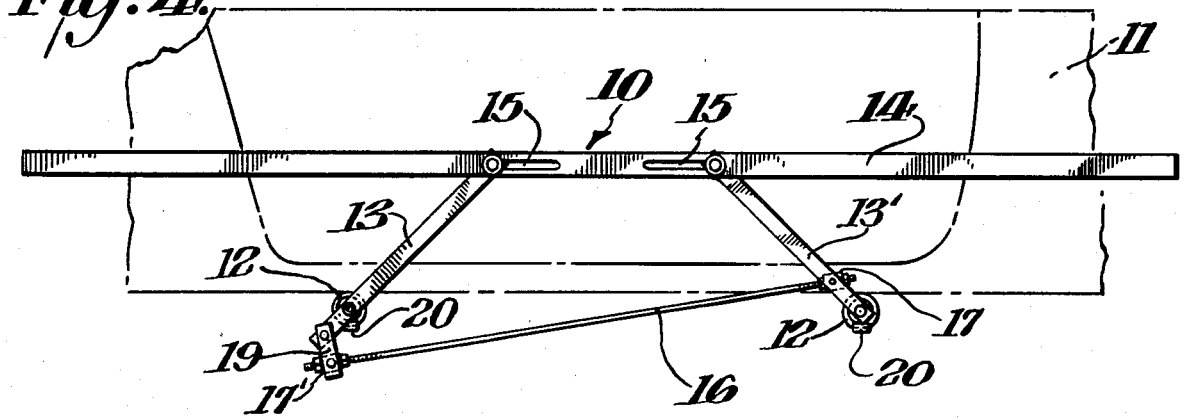
FIG. 4 is a side view of the guard in open positions.

Referring to FIGS. 1, 3 and 4, the protective guard assembly 10 of this invention comprises extension rods 12 which are affixed to the underside of motor vehicle 11. If desired, the extension rods can be composed of a pneumatic cylinder and piston operated by hydraulic means (not shown). Connecting arms 13 and 13' are pivotally mounted on extension rods 12 at the ends thereof. The connecting arms 13 and 13' are slidably affixed and connected to slide slots 15 in bumper guard 14. Grooved rolers 22 and 22' on arms 13 and 13' are used to allow movement in slide slots 15 located in the bumper guard 14. Connecting rod 16 provides stability to the assembly. Said connecting rod 16 and arms 13 and 13' are in pivotal relationship by means of bar 19 and by universal blocks 17 and 17', said universal blocks being constructed to allow arms 13 and 13' to pivot with the ends of rod 16 as the assembly is opened and closed.

In FIG. 5 and FIG. 6 is shown an alternative embodiment of the bumper guard. The assembly 40 in FIG. 5 is in closed position and is shown attached to the underside of an automobile body 41 by means of sliding connectors 42 and 42' to which is mounted the bumper means. The bumper 44 in this embodiment is in the shape of an angle iron. The bumper is slidably attached to slide slots 45 and 45' by means of connecting arms 43 and 43' connecting link 46 is slidably attached to a tail extension 49 which is rigidly attached to an end portion of one connection arm at 47' and a midportion of the other connecting arm at 47. Each slide slot 45 and 45' has an enlarged end 50 and 50' which receives the spring lock mechanism 52 and 52'.

FIG. 7 shows the assembly in extended position pulled away from the automobile. Circular extension tubes 54 and 54' are telescopically mounted within square support tubes 53 and 53' attached to the automobile frame. Knobs or stop plates 62 and 62' are attached to the rearend portion of the extension tubes to prevent the assembly from being pulled out of the square support tubes.

FIG. 8 is an enlarged diagram of the spring locking mechanism shown in the down position. A knob 58' is connected to a shank 57. The knob has a circular indexing shoulder 56' which is larger than the slot 50. A spring 59' provides a tension to the knob against the bumper. The spring is held onto the shank by nut 60'.

FIG. 9 shows the locking mechanism in down position wherein a lock indication and stop 55 attached to the circular extension tube 54 corresponds with and is directed to a corner portion of the square support tube 53. Also shown is the knob 62 and peg 63 which limit the forward movement of the circular extension tube.

FIG. 10 shows the spring locking mechanism in raised position wherein the circular indexing shoulder 56' is depressed in the enlarged portion of the slot.

FIG. 11 shows the locking mechanism in raised position wherein the indicator 55 abutts against the end of the square support tube to hold the assembly in an extended position away from the automobile. The indicator moes approximately 60° from the closed position to raised position.

The assembly can be made of metal, such as steel, or plastic, plastic coated metal, or rubber coated metal and the like to protect the vehicle finish.

In closed position, each element of the assembly is aligned in parallel relationship with the side of the motor vehicle, and the extension rods are in their closed position so that the aligned elements are closely adjacent the vehicle (or even abutting if guarded with a protective coating of plastic or rubber).

To open the assembly, the elements are pulled out (or driven if the extension rods are hydraulically operated), thus causing the extension rods to extend to their open position typical of 4-bar movement assemblies. In a preferred embodiment the extension rods extend about twelve inches. Once the extension rods are extended, the bumper guard 14 is drawn up thus forcing arms 13 outwardly along horizontally disposed slide slots 15. To close the assembly, a reverse procedure is employed.

In a preferred embodiment, depending upon the automobile, the bumper guard 14 is about 6' long, each support arm 13 and 13' is about 18" long, each slot in bumper 14 is about 5" long. Connecting rod 16 is about 4' long, and bar 19 is about 3" long.

Figure 2:
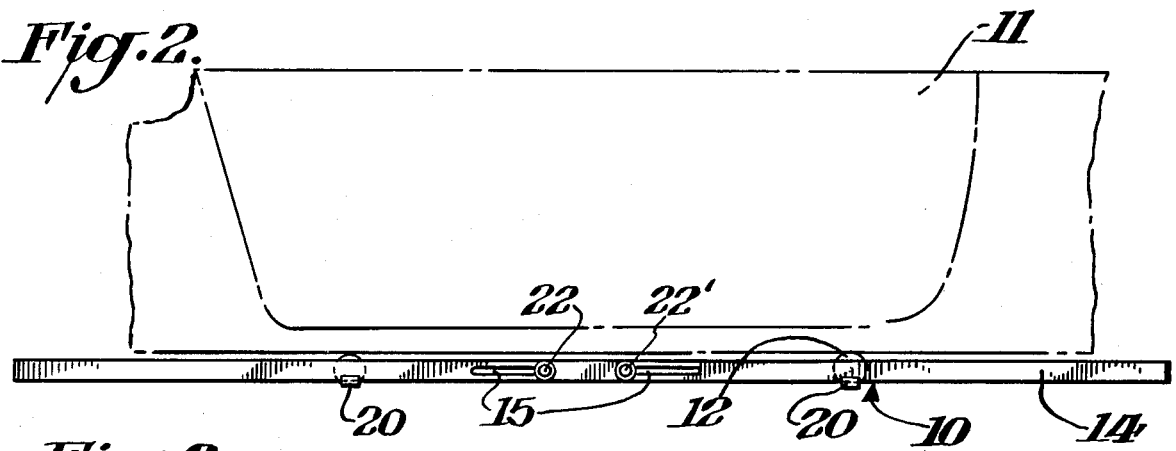
FIG. 2 is a side view of the guard in closed position.

When the protective guard assembly is closed as shown in FIG. 2, bumper guard 14 comes to rest in support brackets 20 that are attached to the ends of the extension rod 12, thereby storing the protective guard assembly in closed position. The device can be adapted to be locked in place in the closed position and doubly locked in the opened position. The assembly can be conveniently locked by conventional locking means such as a spring release or bolt adapted on the grooved rollers 22 and 22' on arms 13' communicating with slots 15.

The extension rods 12 can be adapted with locking means whereby motion of the extension rods is prevented in the open and closed positions until said locking means is manually released. Naturally, a key-lock mechanism can be used to prevent others from opening and closing the mechanism.

The locking mechanism 52' shown in FIG. 8 and FIG. 9 is identical to the locking mechanism 52. The locking mechanisms are manipulated by pulling the bumper to the raised position at which time the shoulder in the knob is depressed in the enlarged portion of the slot thereby locking the bumper in raised positions. Lowering of the guard is accomplished by pulling the knob forward, removing the shoulder portion of the knob from the enlarged portion of the slot and holding the knob in that position and then pushing the bumper downwardly.

I claim:

1. A protective guard apparatus to be used in combination with a motor vehicle which comprises, in combination,
    (a) bumper means positioned parallel to a side of said vehicle comprising an elongated bumper containing two slides slots elongated in the direction of elongation of the bumper;
    (b) extension means affixed to the vehicle for moving said bumper means between a position adjacent said vehicle and another position spaced further away from the side of said vehicle;
    (c) pivot means operatively connected to said bumper means and said extension means for upwardly raising and downwardly lowering said bumper means when spaced away from the side of said vehicle comprising two support arms, each having one end slidably affixed to a different said slide slot and the opposite end of each in permanently affixed relation with one another, said arms being engaged in said slide slots such that when ends of the arms are moved along the slides slots the bumper means moves upwardly from one position being the closed position, to a second position, being the raised position parallel to the first position and when the ends of the arms are moved in the opposite direction along the slide slots, the bumper means moves downwardly from the raised position to the closed; and
    (d) locking means for maintaining the bumper means in raised position.

2. The protective guard of claim 1 wherein the bumper means has an angle iron shape.

3. The protective guard of claim 2 wherein the bumper means is coated with plastic.

4. The protective guard of claim 2 wherein the bumper means is 6 feet long and the extension means is 18 inches long.

5. The protective guard of claim 1 wherein the locking means comprises a knob having a shoulder and said shoulder recesses into an enlarged portion of the slide slot.

* * * * *